United States Patent
Chen et al.

(10) Patent No.: US 12,159,378 B2
(45) Date of Patent: Dec. 3, 2024

(54) HIGH-CONTRAST MINIMUM VARIANCE IMAGING METHOD BASED ON DEEP LEARNING

(71) Applicant: SOUTH CHINA UNIVERSITY OF TECHNOLOGY, Guangdong (CN)

(72) Inventors: Junying Chen, Guangdong (CN); Renxin Zhuang, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 555 days.

(21) Appl. No.: 17/626,503

(22) PCT Filed: Oct. 25, 2019

(86) PCT No.: PCT/CN2019/113196
§ 371 (c)(1),
(2) Date: Jun. 22, 2022

(87) PCT Pub. No.: WO2021/007989
PCT Pub. Date: Jan. 21, 2021

(65) Prior Publication Data
US 2022/0343466 A1    Oct. 27, 2022

(30) Foreign Application Priority Data
Jul. 12, 2019  (CN) .......................... 201910631984.6

(51) Int. Cl.
*G06T 5/70*   (2024.01)
*G06N 3/04*   (2023.01)
*G06N 3/08*   (2023.01)

(52) U.S. Cl.
CPC ................. *G06T 5/70* (2024.01); *G06N 3/04* (2013.01); *G06N 3/08* (2013.01);
(Continued)

(58) Field of Classification Search
CPC ............. G06T 5/70; G06T 2207/10132; G06T 2207/20081; G06T 2207/20084;
(Continued)

(56) References Cited

U.S. PATENT DOCUMENTS

2020/0081107 A1* 3/2020 Shin .................... G01S 7/52047
2020/0253586 A1* 8/2020 Zhang .................. G06T 7/0012

FOREIGN PATENT DOCUMENTS

CN      105760892          7/2016
CN      105760892  A   *   7/2016
(Continued)

OTHER PUBLICATIONS

Luchies, Adam, and Brett Byram. "Suppressing off-axis scattering using deep neural networks." Medical Imaging 2018: Ultrasonic Imaging and Tomography. vol. 10580. SPIE, 2018; hereafter referred to as Luchies (Year: 2018).*

(Continued)

*Primary Examiner* — Ping Y Hsieh
*Assistant Examiner* — Vaisali Rao Koppolu
(74) *Attorney, Agent, or Firm* — JCIPRNET

(57) ABSTRACT

Disclosed is a high-contrast minimum variance imaging method based on deep learning. For the problem of the poor performance of a traditional minimum variance imaging method in terms of ultrasonic image contrast, a deep neural network is applied in order to suppress an off-axis scattering signal in channel data received by an ultrasonic transducer, and after the deep neural network is combined with a minimum variance beamforming method, an ultrasonic image with a higher contrast can be obtained while the resolution performance of the minimum variance imaging method is maintained. In the present method, compared with the traditional minimum variance imaging method, after an apodization weight is calculated, channel data is first pro- (Continued)

cessed by using a deep neural network, and weighted stacking of the channel data is then carried out, so that the pixel value of a target imaging point is obtained, thereby forming a complete ultrasonic image.

9 Claims, 4 Drawing Sheets

(52) U.S. Cl.
CPC ............... *G06T 2207/10132* (2013.01); *G06T 2207/20081* (2013.01); *G06T 2207/20084* (2013.01)

(58) Field of Classification Search
CPC ... G06T 5/60; G06T 5/10; G06N 3/04; G06N 3/08; G06N 3/045; G01S 15/89
See application file for complete search history.

(56) References Cited

FOREIGN PATENT DOCUMENTS

| CN | 109965905 | | 7/2019 | |
|---|---|---|---|---|
| EP | 3712651 | A1 * | 9/2020 | ........... A61B 8/5207 |
| WO | 2018127497 | | 7/2018 | |

OTHER PUBLICATIONS

Adam C. Luchies et al., "Deep Neural Networks for Ultrasound Beamforming," IEEE Transactions on Medical Imaging, vol. 37, Sep. 2018, pp. 1-4.

Johan-Fredrik Synnevåg et al., "Adaptive Beamforming Applied to Medical Ultrasound Imaging," IEEE transactions on ultrasonics, ferroelectrics, and frequency control, vol. 54, Aug. 2007, pp. 1606-1613.

Ben Luijten et al., "Deep Learning for Fast Adaptive Beamforming," ICASSP 2019—2019 IEEE International Conference on Acoustics, Speech and Signal Processing (ICASSP), May 2019, pp. 1333-1337.

Dongwoon Hyun et al., "Beamforming and Speckle Reduction Using Neural Networks," IEEE Transactions on Ultrasonics, Ferroelectrics, and Frequency Control, vol. 66, May 2019, pp. 898-910.

Xu Mengling, "Research on adaptive beamforming methods in medical ultrasound imaging," Doctor's thesis, Department of Biomedical Engineering, Huazhong University of Science and Technology, May 2014, pp. 1-120.

"International Search Report (Form PCT/ISA/210) of PCT/CN2019/113196," mailed on Apr. 16, 2020, with English translation thereof, pp. 1-6.

* cited by examiner

HIGH-CONTRAST MINIMUM VARIANCE IMAGING METHOD BASED ON DEEP LEARNING

CROSS-REFERENCE TO RELATED APPLICATION

This application is a 371 of international application of PCT application serial no. PCT/CN2019/113196, filed on Oct. 25, 2019, which claims the priority benefits of China application no. 201910631984.6, filed on Jul. 12, 2019. The entirety of each of the above mentioned patent applications is hereby incorporated by reference herein and made a part of this specification.

TECHNICAL FIELD

The present invention belongs to the field of ultrasound imaging, and innovatively proposes a high-contrast minimum variance imaging method based on deep learning, which improves the conventional minimum variance imaging method.

BACKGROUND

In ultrasound imaging, the existence of off-axis scattering degrades the quality of ultrasound images. In recent years, the combination of deep learning and ultrasound imaging has become a hot area of research. With the strong generalization ability of deep learning, once a deep neural network has been trained with appropriate training data, the desired imaging effect can be obtained by using the trained network model. Therefore, with appropriate training data, a deep neural network model that can suppress off-axis scatter signals can be obtained.

The minimum variance beamforming method has been widely studied by many scholars since it was put forward, and many improved techniques have been proposed. For example, spatial smoothing can improve the accuracy of estimation of a covariance matrix from data; diagonal loading can improve the robustness of the minimum variance beamforming method; forward-backward minimum variance beamforming can improve both the robustness of the minimum variance beamforming method and the contrast of the images generated; eigenspace-based beamforming can improve the quality of ultrasound images; and eigenspace-based beamforming combined with sign coherence factor can improve both the robustness of the minimum variance beamforming method and the resolution and contrast of ultrasound images. However, the performance of the minimum variance beamforming method in terms of contrast has never been satisfying, and the research on the minimum variance beamforming method has also hit a bottleneck in improving its performance in terms of contrast. Nowadays, the popular deep learning technology brings new opportunities for the research on the minimum variance imaging method. How to combine deep learning with minimum variance imaging method is worth discussing, as a high-contrast minimum variance imaging method based on deep learning has potential to improve the performance of the minimum variance imaging method with regard to contrast.

The high-contrast minimum variance imaging method based on deep learning proposed by the present invention combines the deep neural network with the minimum variance imaging method, which is a novel minimum variance imaging method.

SUMMARY

The main purpose of the present invention is to improve the performance of the minimum variance imaging method in terms of contrast. At present, the research on the combination of deep learning and ultrasound imaging methods has just started. The present invention adds a deep neural network operator to the minimum variance imaging method, which suppresses off-axis scatter ultrasound signals and improves the performance of the minimum variance imaging method. The imaging method of the present invention improves image contrast without compromising image resolution, and thus can obtain high-quality ultrasound images with good performance in both resolution and contrast.

The purpose of the present invention is achieved by at least one of the following technical schemes.

A high-contrast minimum variance imaging method based on deep learning includes the following steps:

S1. scanning a target object for ultrasound imaging, generating channel data composed of echo signals received by reception channels of an ultrasound transducer, and performing respective delay operation with regard to different points for imaging to obtain delay channel data;

S2. calculating, according to principles of a minimum variance beamforming method, an apodization weight vector for channels based on the delay channel data obtained in S1; and at the same time, performing short-time Fourier transform on the delay channel data obtained in S1 to obtain frequency domain delay channel data;

S3. suppressing off-axis scatter signals in the frequency domain delay channel data obtained in S2 by using a deep neural network, to obtain frequency domain delay channel data with suppressed off-axis scatter signals;

S4. performing inverse short-time Fourier transform on the frequency domain delay channel data with suppressed off-axis scatter signals obtained in S3 to obtain delay channel data of each channel that have been processed by the deep neural network;

S5. dividing the delay channel data that have been processed by the deep neural network obtained in S4 into corresponding sub-aperture vectors; and S6. performing weighted summation and calculating an average with the apodization weight vector obtained in S2 and the sub-aperture vectors of the delay channel data that have been processed by the deep neural network obtained in S5 to obtain image pixel values of the corresponding target object for ultrasonic imaging, thereby forming a complete ultrasound image, which has the advantage of having a high contrast.

Further, in step S1, the scanning a target object for ultrasonic imaging, generating channel data composed of echo signals received by reception channels of an ultrasonic transducer, and then performing delay operation on the channel data comprises: calculating a delay time according to a position of each target point for imaging, a position of each scan line and a position of each reception channel, and mapping the delay time into a signal subscript, so as to extract a signal value corresponding to the target point for imaging in the echo signals of the reception channel and obtain the delay channel data. The delay operation is conventional operation in the ultrasonic imaging process and thus will not be described in detail here.

Let the number of target points for imaging on one scan line be P and the number of reception channels be N, so that a P×N delay channel data matrix is obtained after the delay operation, and let the number of scan lines be L, then a P×N×L delay channel data matrix $M_1$ is needed for imaging each time, and the subsequent steps will be performed based on this delay channel data matrix.

Further, in step S2, for one target point for imaging, a delay channel data vector of length N can be extracted from the delay channel data matrix $M_1$; according to the principles of the minimum variance beamforming method, a spatial smoothing technique is used, that is, a full aperture that contains all the reception channels is divided into several overlapping sub-apertures, a covariance matrix of the delay channel data in each sub-aperture is calculated individually, and then an average of the covariance matrices of all the sub-apertures is calculated. Let the number of channels of each sub-aperture be M, then there are N−M+1 sub-apertures in total, and let the sub-aperture vectors of the delay channel data be $x_i$, where i=1, 2, . . . , N−M+1, and $x_i$ contains the delay channel data of i-th to (i+M−1)-th reception channels. Then, according to the following formula, the covariance matrix of delay channel data in each sub-aperture is calculated and the average is calculated to obtain a final estimated covariance matrix $R_{cov}$:

$$R_{cov} = \frac{1}{N-M+1} \sum_{i=1}^{N-M+1} x_i \cdot x_i^H ;$$

where · represents vector multiplication, and H represents conjugate transposition. The minimum variance beamforming method aims at minimizing the variance of the pixel values of the target points for imaging, and the optimization problem, i.e., to minimize the variance of the pixel values of the target points for imaging, is expressed as the following formula:

$$\min_w w^H \cdot R_{cov} \cdot w$$
$$\text{s.t. } w^H \cdot a = 1;$$

where a is an all-ones vector, · represents vector multiplication, and w is the apodization weight vector of the channels. The solution to the optimization problem is:

$$w = \frac{R_{cov}^{-1} \cdot a}{a^H \cdot R_{cov}^{-1} \cdot a};$$

where −1 represents matrix inversion, and represents vector multiplication; and the weight vector has a length of M, and one weight vector is calculated for each target point for imaging.

After the apodization weight vector of each target point for imaging is obtained, the deep neural network is used to suppress the off-axis scatter signals in the delay channel data, before which the delay channel data need to be transformed into the frequency domain. In ultrasound imaging, it is advantageous to process signal data in frequency domain.

Further, in step S2, the performing short-time Fourier transform on the delay channel data obtained in S1 means using discrete short-time Fourier transform to transform the delay channel data from time domain to frequency domain; the discrete short-time Fourier transform means using sliding of a window function to divide a long signal into several overlapping short signals, which are then subjected to discrete Fourier transform separately to obtain the frequency domain delay channel data; and the formula of the discrete short-time Fourier transform is as follows:

$$STFT[y_p^n](m, k) = \sum_{p=1}^{P} y_p^n w(p-m) e^{\frac{-j2\pi kp}{P}};$$

where $y_p^n$ denotes the delay channel data of an n-th reception channel at a p-th target point for imaging on a scan line; p=1, 2, . . . , P; n=1, 2, . . . , N; w(p−m) is the window function, m being a step size of the sliding of the window function; k is a serial number of the Fourier frequency to be obtained, k having the same value range as p; and j is the imaginary unit.

Further, the window function has a window length of 16, and the delay channel data of each reception channel on one scan line are a signal vector of length P, so P−16+1 signal vectors of length 16 are obtained by the sliding of the window function.

According to a symmetry property of the discrete Fourier transform, when a signal sequence is a real-valued sequence, complex amplitudes obtained from the Fourier transform have a conjugate symmetry property, that is, provided that the signal sequence has a length of 16, then 2nd to 8th complex amplitudes and 10th to 16th complex amplitudes are conjugate symmetric, so only the first nine complex amplitudes need to be used. For one scan line, after the short-time Fourier transform of the channel data, a complex amplitude matrix $M_2$ with a size of 9×(P−16+1)×N is obtained; and then, real and imaginary parts are separated and recombined in accordance with the respective reception channels, and a data matrix $M_3$ with a size of (2×N)×9×(P−16+1) is obtained, which is to be processed by the deep neural network.

Further, in step S3, the deep neural network used is a feed-forward fully-connected network with five hidden layers in total, each hidden layer having 170 neurons; each frequency corresponds to one network, so there are nine of the networks in total, and input and output dimensions of the networks are both 2×N; and the data matrix $M_3$ obtained for each scan line is input into the 9 networks for processing according to the respective frequencies, and the obtained frequency domain delay channel data with suppressed off-axis scatter signals are a data matrix $M_4$ with a size of (2×N)×9×(P−16+1). A training process of the deep neural network is as follows: Field II simulation software is used to simulate and generate off-axis scatter signals and non-off-axis scatter signals to form data of a training set and of a validation set for the deep neural network; the deep neural network is trained with an Adam optimizer which uses mean and variance of gradients to calculate an update step size of network weight parameters, the data of the training set are input into the deep neural network in batch while the Adam optimizer updates the parameters of the deep neural network, a training cycle is a period during which all the data of the training set are processed once, and the data of the validation set are used to calculate an error on the validation set and change a learning rate accordingly after each training cycle ends; and the training process adopts an early stopping strategy, that is, the training is subjected to early stopping in response to the error on the validation set having no improvement after 20 training cycle. The training process takes a long time, but once the training is done, the deep neural network is able to process data quickly.

Further, in step S4, the frequency domain delay channel data with suppressed off-axis scatter signals obtained in S3 is transformed into the time domain; the data matrix $M_4$ is recombined into a complex magnitude matrix $M_5$ with a size of 9×(P−16+1)×N, which is then expanded to a complex magnitude matrix $M_6$ with a size of 16×(P−16+1)×N using the conjugate symmetry property; the complex amplitudes of each reception channel with a size of 16×(P−16+1) are transformed into time domain signals using the inverse short-time Fourier transform, thereby obtaining the delay channel data of each channel that have been processed by the deep neural network, with a length of P, and therefore, the delay channel data of L scan lines that have been processed by the deep neural network are a matrix $M_7$ with a size of P×N×L, which is the same as the size of the delay channel data matrix $M_1$ that has not been processed by the deep neural network.

Further, in step S5, according to the delay channel data that have been processed by the deep neural network obtained in S4, for each target point for imaging on each scan line, a full aperture vector of length N of the delay channel data that have been processed by the deep neural network is extracted and divided into N−M+1 corresponding sub-aperture vectors $z_i$, where i=1, 2, . . . , N−M+1, and $z_i$ contains the delay channel data that have been processed by the deep neural network of the i-th to the (i+M−1)-th channels.

Further, in step S6, the performing weighted summation and calculating an average with the apodization weight vector obtained in S2 and the sub-aperture vectors of the delay channel data that have been processed by the deep neural network obtained in S5 is based on the following formula:

$$v = \frac{1}{N-M+1} \sum_{i=1}^{N-M+1} w^H \cdot z_i;$$

where the obtained v is the pixel value of the target point for imaging, and · represents vector multiplication.

Through the above steps, the pixel values of all target points for imaging on all scan lines can be obtained, and then a complete ultrasound image can be obtained through subsequent operation of envelope detection, logarithmic compression and dynamic range display. The envelope detection and logarithmic compression operation is conventional operation in the ultrasound imaging process and thus will not be described in detail here.

The high-contrast minimum variance imaging method based on deep learning includes two main components, i.e., a deep neural network suppressing off-axis scattering and beamforming. On the basis of the framework of the conventional minimum variance imaging method, a deep neural network operator is added to suppress the off-axis scatter ultrasound signals, thus improving the quality of ultrasound images.

Compared with the prior art, the present invention mainly has the following advantage: by combining the deep learning technique and the minimum-variance beamforming method for the first time, the deep neural network, which can suppress off-axis scattering, is integrated into the minimum variance imaging method as an operator, which can improve the contrast of ultrasound images while maintaining a high resolution.

DETAILED DESCRIPTION

The specific implementation of the present invention will be further described with reference to the drawings and embodiments below, which, however, should not be construed as a limitation on the implementation and scope of protection of the present invention. It should be noted that details which are not set forth below can be implemented by those skilled in the art with reference to the prior art.

EMBODIMENT

Figure 1:
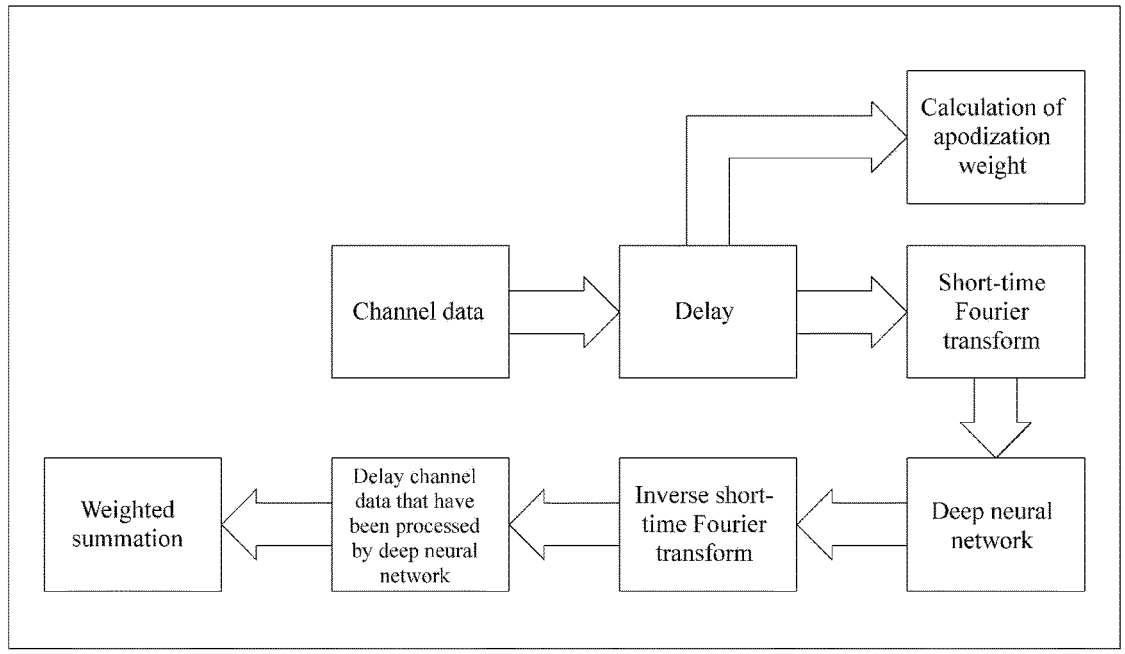
FIG. 1 is a schematic diagram of an imaging process of a high-contrast minimum variance imaging method based on deep learning.
Figure 2:
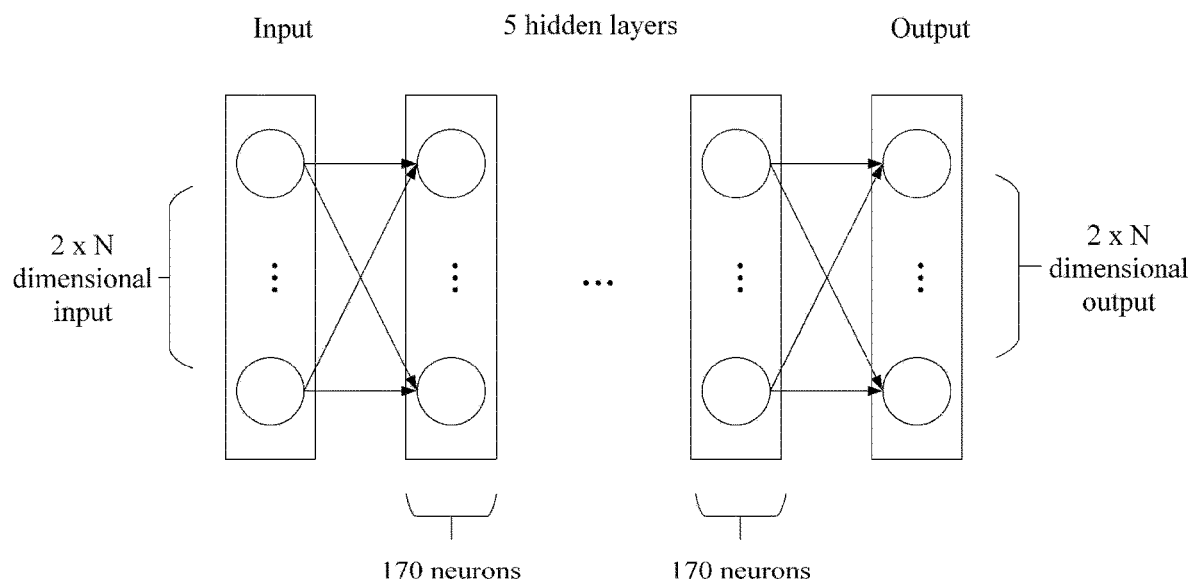
FIG. 2 is a topology diagram of a deep neural network used in the imaging method shown in FIG. 1.

As shown in FIG. 1, a high-contrast minimum variance imaging method based on deep learning includes the following steps:

S1. scanning a target object for ultrasonic imaging, generating channel data composed of echo signals received by reception channels of an ultrasonic transducer, and performing respective delay operation with regard to different points for imaging to obtain delay channel data;

S2. calculating, according to principles of a minimum variance beamforming method, an apodization weight vector for channels based on the delay channel data obtained in S1; and at the same time, performing short-time Fourier transform on the delay channel data obtained in S1 to obtain frequency domain delay channel data;

S3. suppressing off-axis scatter signals in the frequency domain delay channel data obtained in S2 by using a deep neural network, to obtain frequency domain delay channel data with suppressed off-axis scatter signals;

S4. performing inverse short-time Fourier transform on the frequency domain delay channel data with suppressed off-axis scatter signals obtained in S3 to obtain delay channel data of each channel that have been processed by the deep neural network;

S5. dividing the delay channel data that have been processed by the deep neural network obtained in S4 into corresponding sub-aperture vectors; and S6. performing weighted summation and calculating an average with the apodization weight vector obtained in S2 and the sub-aperture vectors of the delay channel data that have been processed by the deep neural network obtained in S5 to obtain image pixel values of the corresponding target object for ultrasound imaging, thereby forming a complete ultrasound image, which has the advantage of having a high contrast.

Further, in step S1, the scanning a target object for ultrasound imaging, generating channel data composed of echo signals received by reception channels of an ultrasound transducer, and then performing delay operation on the channel data comprises: calculating a delay time according to a position of each target point for imaging, a position of each scan line and a position of each reception channel, and mapping the delay time into a signal subscript, so as to extract a signal value corresponding to the target point for imaging in the echo signals of the reception channel and obtain the delay channel data. The delay operation is conventional operation in the ultrasound imaging process and thus will not be described in detail here.

Let the number of target points for imaging on one scan line be P and the number of reception channels be N, so that a P×N delay channel data matrix is obtained after the delay operation, and let the number of scan lines be L, then a P×N×L delay channel data matrix $M_1$ is needed for imaging each time, and the subsequent steps will be performed based on this delay channel data matrix.

Further, in step S2, for one target point for imaging, a delay channel data vector of length N can be extracted from the delay channel data matrix $M_1$; according to the principles of the minimum variance beamforming method, a spatial smoothing technique is used, that is, a full aperture that contains all the reception channels is divided into several overlapping sub-apertures, a covariance matrix of the delay channel data in each sub-aperture is calculated individually, and then an average of the covariance matrices of all the sub-apertures is calculated. Let the number of channels of each sub-aperture be M, then there are N−M+1 sub-apertures in total, and let the sub-aperture vectors of the delay channel data be $x_i$, where i=1, 2, ..., N−M+1, and $x_i$ contains the delay channel data of i-th to (i+M−1)-th reception channels. Then, according to the following formula, the covariance matrix of delay channel data in each sub-aperture is calculated and the average is calculated to obtain a final estimated covariance matrix $R_{cov}$:

$$R_{cov} = \frac{1}{N-M+1} \sum_{i=1}^{N-M+1} x_i \cdot x_i^H;$$

where · represents vector multiplication, and H represents conjugate transposition. The minimum variance beamforming method aims at minimizing the variance of the pixel values of the target points for imaging, and the optimization problem, i.e. to minimize the variance of the pixel values of the target points for imaging, is expressed as the following formula:

$$\min_{w} w^H \cdot R_{cov} \cdot w$$
$$\text{s.t. } w^H \cdot a = 1;$$

where a is an all-ones vector, · represents vector multiplication, and w is the apodization weight vector of the channels. The solution to the optimization problem is:

$$w = \frac{R_{cov}^{-1} \cdot a}{a^H \cdot R_{cov}^{-1} \cdot a};$$

where −1 represents matrix inversion, and · represents vector multiplication; and the weight vector has a length of M, and one weight vector is calculated for each target point for imaging.

After the apodization weight vector of each target point for imaging is obtained, the deep neural network is used to suppress the off-axis scatter signals in the delay channel data, before which the delay channel data need to be transformed into the frequency domain. In ultrasound imaging, it is advantageous to process signal data in frequency domain.

Further, in step S2, the performing short-time Fourier transform on the delay channel data obtained in S1 means using discrete short-time Fourier transform to transform the delay channel data from time domain to frequency domain; the discrete short-time Fourier transform means using sliding of a window function to divide a long signal into several overlapping short signals, which are then subjected to discrete Fourier transform separately to obtain the frequency domain delay channel data; and the formula of the discrete short-time Fourier transform is as follows:

$$STFT[y_p^n](m, k) = \sum_{p=1}^{P} y_p^n w(p-m) e^{\frac{-j2\pi kp}{P}};$$

where $y_p^n$ denotes the delay channel data of an n-th reception channel at a p-th target point for imaging on a scan line; p=1, 2, ..., P; n=1, 2, ..., N; w(p−m) is the window function, m being a step size of the sliding of the window function; k is a serial number of the Fourier frequency to be obtained, k having the same value range as p; and j is the imaginary unit. The window function has a window length of 16, and the delay channel data of each reception channel on one scan line are a signal vector of length P, so P−16+1 signal vectors of length 16 are obtained by the sliding of the window function.

According to a symmetry property of the discrete Fourier transform, when a signal sequence is a real-valued sequence, complex amplitudes obtained from the Fourier transform have a conjugate symmetry property, that is, provided that the signal sequence has a length of 16, then 2nd to 8th complex amplitudes and 10th to 16th complex amplitudes are conjugate symmetric, so only the first nine complex amplitudes need to be used. For one scan line, after the short-time Fourier transform of the channel data, a complex amplitude matrix $M_2$ with a size of 9×(P−16+1)×N is obtained; and then, real and imaginary parts are separated and recombined in accordance with the respective reception channels, and a data matrix $M_3$ with a size of (2×N)×9×(P−16+1) is obtained, which is to be processed by the deep neural network.

Further, in step S3, the deep neural network used is a feed-forward fully-connected network with five hidden layers in total, each hidden layer having 170 neurons; each frequency corresponds to one network, so there are nine of the networks in total, and input and output dimensions of the networks are both 2×N; and the data matrix $M_3$ obtained for each scan line is input into the 9 networks for processing according to the respective frequencies, and the obtained frequency domain delay channel data with suppressed off-axis scatter signals are a data matrix $M_4$ with a size of (2×N)×9×(P−16+1). A training process of the deep neural network is as follows: Field II simulation software is used to simulate and generate off-axis scatter signals and non-off-axis scatter signals to form data of a training set and of a validation set for the deep neural network, where the training set consists of off-axis scatter signals generated by 5,000 scattering points and non-off-axis scatter signals generated by 5,000 scattering points, the validation set consists of off-axis scatter signals generated by 1,250 scattering points and non-off-axis scatter signals generated by 1,250 scattering points, and the deep neural network uses the data of the training set to learn how to identify off-axis scatter signals and suppress them; the deep neural network is trained with an Adam optimizer which uses mean and variance of gradients to calculate an update step size of network weight parameters, the data of the training set are input into the deep neural network in batch while the Adam optimizer updates the parameters of the deep neural network, a training cycle is a period during which all the data of the training set are processed once, and the data of the validation set are used to calculate an error on the validation set and change a learning rate accordingly after each training cycle ends; and the training process adopts an early stopping strategy, that is, the training is subjected to early stopping in response to the error on the validation set having no improvement after 20 training cycle. The training process takes a long time, but once the training is done, the deep neural network is able to process data quickly.

Further, in step S4, the frequency domain delay channel data with suppressed off-axis scatter signals obtained in S3 is transformed into the time domain; the data matrix $M_4$ is recombined into a complex magnitude matrix $M_5$ with a size of 9×(P−16+1)×N, which is then expanded to a complex magnitude matrix $M_6$ with a size of 16×(P−16+1)×N using the conjugate symmetry property; the complex amplitudes of each reception channel with a size of 16×(P−16+1) are transformed into time domain signals using the inverse short-time Fourier transform, thereby obtaining the delay channel data of each channel that have been processed by the deep neural network, with a length of P, and therefore, the delay channel data of L scan lines that have been processed by the deep neural network are a matrix $M_7$ with a size of P×N×L, which is the same as the size of the delay channel data matrix $M_1$ that has not been processed by the deep neural network.

Further, in step S5, according to the delay channel data that have been processed by the deep neural network obtained in S4, for each target point for imaging on each scan line, a full aperture vector of length N of the delay channel data that have been processed by the deep neural network is extracted and divided into N−M+1 corresponding sub-aperture vectors $z_i$, where i=1, 2, . . . , N−M+1, and $z_i$ contains the delay channel data that have been processed by the deep neural network of the i-th to the (i+M−1)-th channels.

Further, in step S6, the performing weighted summation and calculating an average with the apodization weight vector obtained in S2 and the sub-aperture vectors of the delay channel data that have been processed by the deep neural network obtained in S5 is based on the following formula:

$$v = \frac{1}{N-M+1} \sum_{i=1}^{N-M+1} w^H \cdot z_i;$$

where the obtained v is the pixel value of the target point for imaging, and represents vector multiplication.

Through the above steps, the pixel values of all target points for imaging on all scan lines can be obtained, and then a complete ultrasound image can be obtained through subsequent operation of envelope detection, logarithmic compression and dynamic range display. The envelope detection and logarithmic compression operation is conventional operation in the ultrasound imaging process and thus will not be described in detail here.

The high-contrast minimum variance imaging method based on deep learning includes two main components, i.e. a deep neural network suppressing off-axis scattering and beamforming. On the basis of the steps of the conventional minimum variance imaging method, a deep neural network operator is added to suppress the off-axis scatter ultrasound signals, thus improving the contrast of ultrasound images.

The high-contrast minimum variance imaging method based on deep learning proposed by the present invention will eventually be applied to ultrasound imaging. In this embodiment, a simulation ultrasound imaging system is constructed by three modules, i.e., a data simulation module, a core computing module and an image display module.

1. Data Simulation Module

Field II simulation software is used to simulate a propagation process of ultrasound waves in ultrasound imaging and obtain simulation data. In the data simulation module, firstly, physical simulation data are simulated according to corresponding configuration of a real ultrasound imaging device, where transmitting and receiving array elements are created, and a simulated detection object is created, and then transmit is simulated with scan lines one by one and channel data are received. In this module, a simulated single-point target object and cyst object are created respectively to observe their imaging effects.

2. Core Computing Module

The core computing module includes an apodization weight calculation module and a deep neural network processing module. A training process of the deep neural network is as follows: Field II simulation software is used to simulate and generate off-axis scatter signals and non-off-axis scatter signals to form data of a training set and of a validation set for the deep neural network, where the training set consists of off-axis scatter signals generated by 5,000 scattering points and non-off-axis scatter signals generated by 5,000 scattering points, the validation set consists of off-axis scatter signals generated by 1,250 scattering points and non-off-axis scatter signals generated by 1,250 scattering points, and the deep neural network uses the data of the training set to learn how to identify off-axis scatter signals and suppress them; the deep neural network is trained with an Adam optimizer which uses mean and variance of gradients to calculate an update step size of network weight parameters, the data of the training set are input into the deep neural network in batch while the Adam optimizer updates the parameters of the deep neural network, a training cycle is a period during which all the data of the training set are processed once, and the data of the validation set are used to calculate an error on the validation set and change a learning rate accordingly after each training cycle ends; and The training process adopts an early stopping strategy, that is, the training is subjected to early stopping in response to the error on the validation set having no improvement after 20 training cycles. After the received channel data is obtained, the apodization weight vector is calculated by the apodization weight calculation module according to the principles of the minimum variance beamforming method. Then, the neural network processing module uses the well-trained deep neural network to process the channel data to suppress off-axis scatter signals, and then weighted summation is carried out to obtain the pixel value of each target point for imaging.

3. Image Display Module

In the simulation ultrasound imaging system, after the pixel data are obtained by the core computing module, the image display module uses corresponding decoding programs to perform Hilbert transform, logarithmic compression, grayscale range correction, image depth and width calculation and image display operation on the data, and finally outputs the image-related data to a corresponding coordinate system to display the ultrasound image on a screen.

In the simulated ultrasound imaging, the conventional minimum variance imaging method and the high-contrast minimum variance imaging method based on deep learning are used respectively to calculate the same echo data for comparison.

Figure 3:
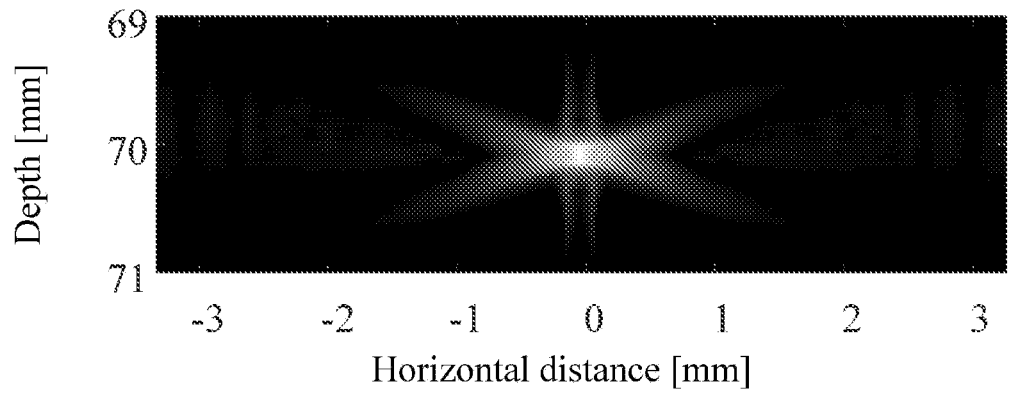
FIG. 3 is an embodiment of a single-point target image output by a conventional minimum variance imaging method.
Figure 4:
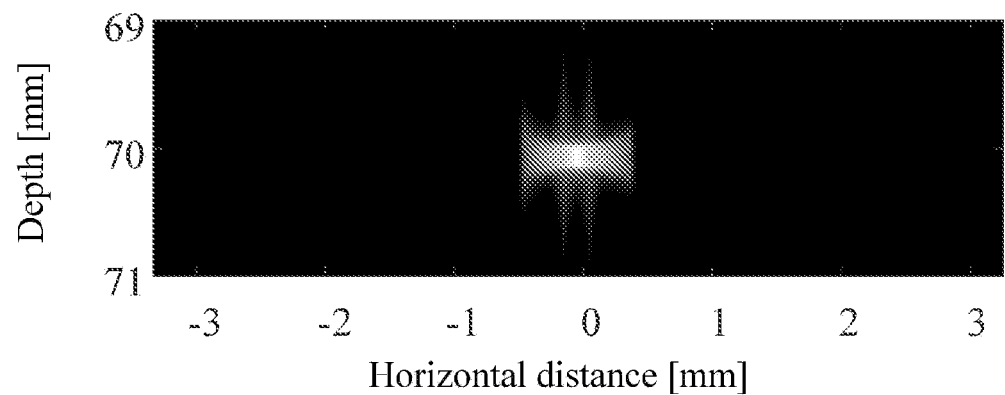
FIG. 4 is an embodiment of a single-point target image output by a high-contrast minimum variance imaging method based on deep learning.
Figure 5:
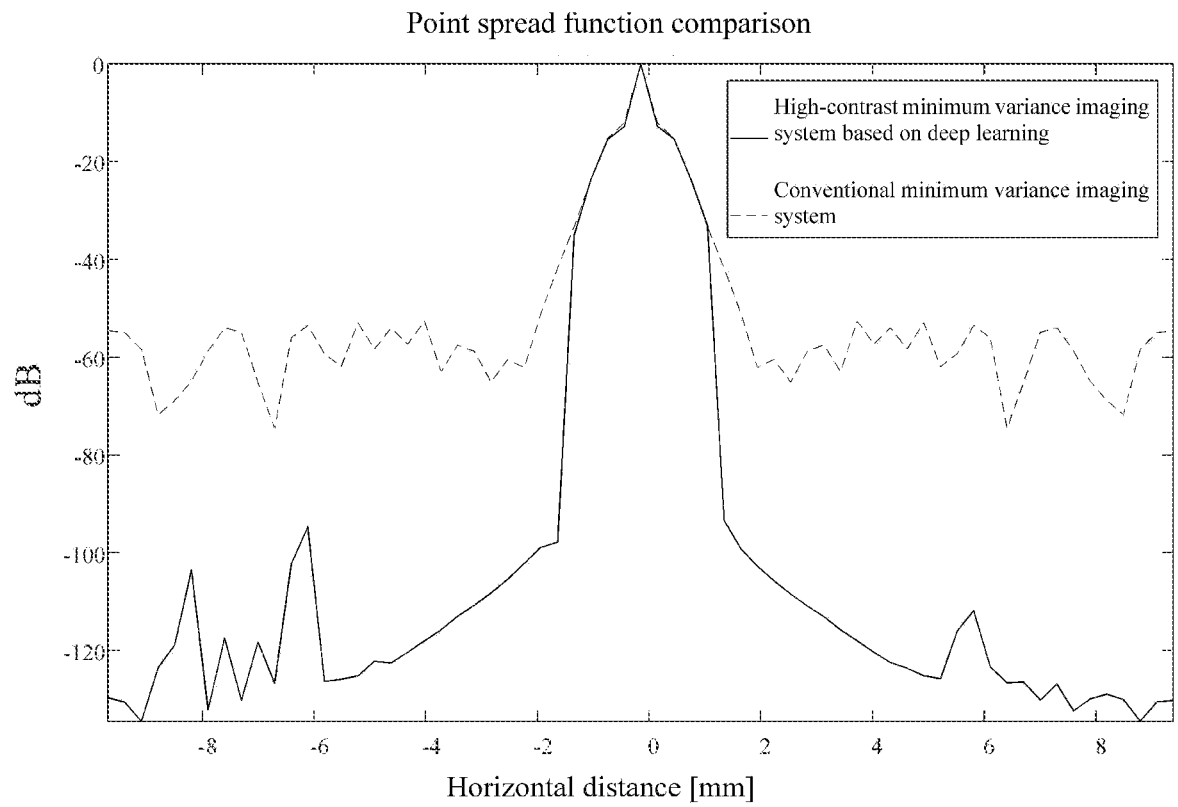
FIG. 5 is a point spread function comparison graph of a single-point target calculated by the high-contrast minimum variance imaging method based on deep learning and the conventional minimum variance imaging method.

Scheme and Performance Evaluation:

In the single-point target simulation experiment, there is only one scattering point in the imaging region, which is located at a depth of 70 mm. After the data simulation module is invoked to get the channel data, the core computing module is called to perform calculation for the image by using the conventional minimum variance imaging method and the high-contrast minimum variance imaging method based on deep learning, respectively. The images obtained after the calculation are shown in FIGS. 3 and 4. It can be seen that the high-contrast minimum variance imaging method based on deep learning can effectively suppress the signals scattered from scattering points to both sides. Point spread function comparison is shown in FIG. 5. It can be seen that the high-contrast minimum variance imaging method based on deep learning not only maintains the main lobe width of the minimum variance beamforming method, namely, without compromising the resolution performance of the minimum variance beamforming method, but also effectively reduces the sidelobe level by about 60 dB.

Figure 6:
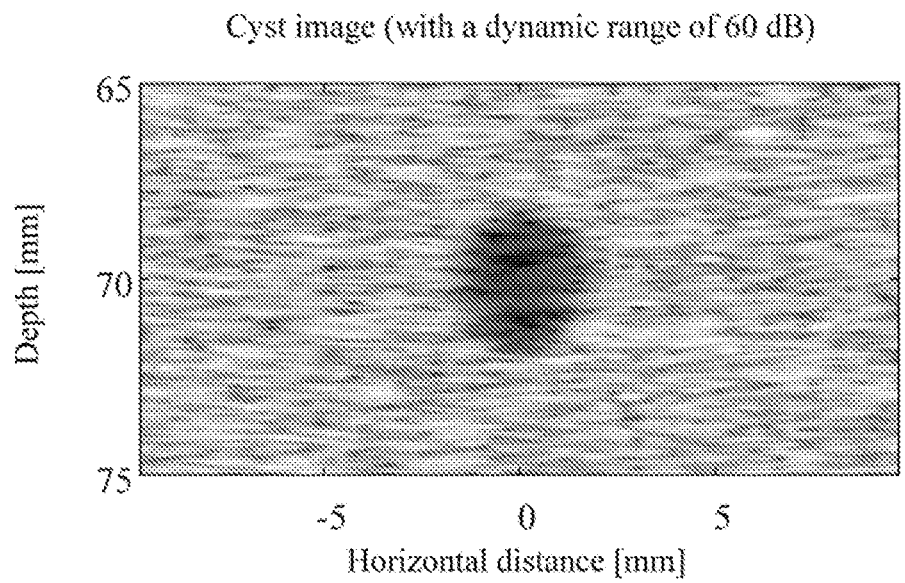
FIG. 6 is an embodiment of a cyst image output by the conventional minimum variance imaging method.
Figure 7:
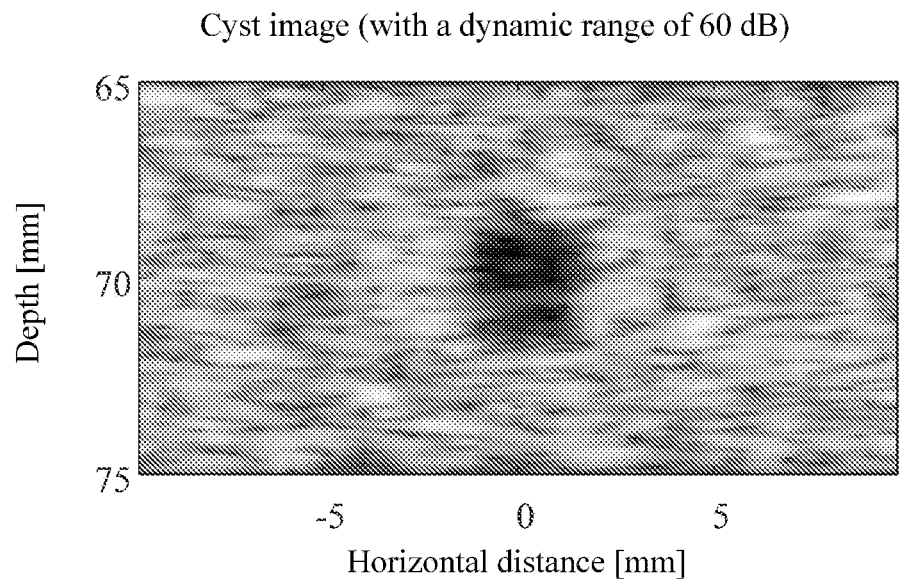
FIG. 7 is an embodiment of a cyst image output by the high-contrast minimum variance imaging method based on deep learning.
Figure 8:
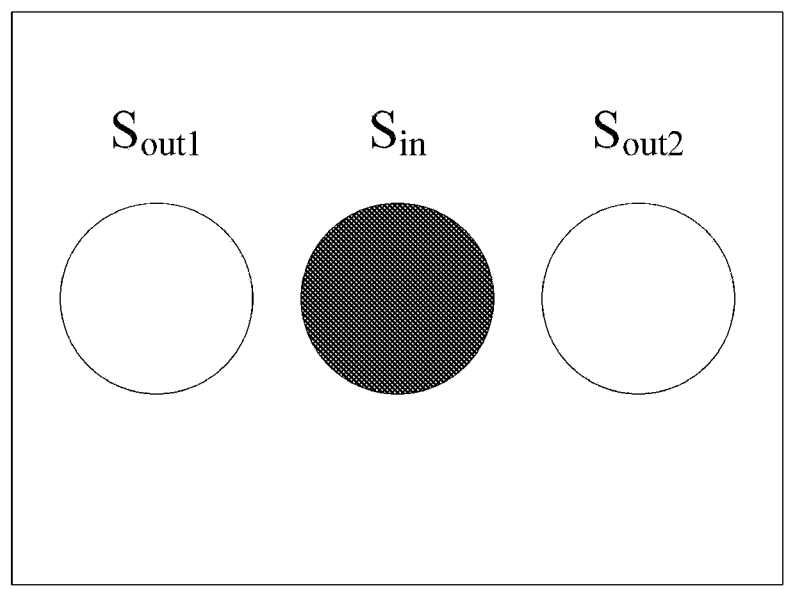
FIG. 8 is a schematic diagram of regions in and out of a cyst that are selected for calculating image contrast.

In the cyst imaging simulation experiment, the imaging depth is 65 mm to 75 mm, there are 25 scattering points per cubic millimeter in the imaging region, and the center of a spherical cyst with a diameter of 4 mm is located at a depth of 70 mm. After the data simulation module is invoked to get the channel data, the core computing module is called to perform calculation for the image by using the conventional minimum variance imaging method and the high-contrast minimum variance imaging method based on deep learning, respectively. The images obtained after the calculation are shown in FIGS. 6 and 7. The pixels in the cyst region are darker after being processed by the high-contrast minimum variance imaging method based on deep learning, which suggests that the deep neural network effectively suppresses the scatter signals in the cyst region. The regions in and out of a cyst that are selected for calculating image contrast are shown in FIG. 8. Two regions, which have the same area as the cyst area, are selected on two sides of the cyst, respectively. The average pixel values in the two regions are calculated and averaged to get the average pixel value out of the cyst region: $S_{out}=(S_{out1}+S_{out2})/2$, where $S_{out1}$ is the average pixel value in region 1 out of the cyst region, and $S_{out2}$ is the average pixel value in region 2 out of the cyst region. $S_{in}$ is the average pixel value in the cyst region, and then the contrast CR is calculated as follows:

$$CR = \frac{S_{out} - S_{in}}{S_{out}}.$$

The calculated image contrast is 0.3568 in FIG. 6, and 0.3900 in FIG. 7, which shows that the high-contrast minimum variance imaging method based on deep learning improves the contrast. According to the above data, compared with the conventional minimum variance imaging method, the high-contrast minimum variance imaging method based on deep learning of the present invention improves the image contrast without compromising the image resolution.

The embodiment describes the improvement of ultrasound image quality by designing and evaluating the high-contrast minimum variance imaging method based on deep learning in simulated ultrasound imaging. The evaluation results show that the contrast of the ultrasound image is improved by using the high-contrast minimum variance imaging method based on deep learning compared with the conventional minimum variance imaging method.

What is claimed is:

1. A high-contrast minimum variance imaging method based on deep learning, comprising the following steps:
    S1. scanning a target object for ultrasound imaging, generating a channel data composed of echo signals received by reception channels of an ultrasound transducer, and performing a respective delay operation with regard to different points for imaging to obtain a delay channel data;
    S2. calculating, according to principles of a minimum variance beamforming method, an apodization weight vector for channels based on the delay channel data obtained in the S1; and at the same time, performing short-time Fourier transform on the delay channel data obtained in the S1 to obtain a frequency domain delay channel data;
    S3. suppressing off-axis scatter signals in the frequency domain delay channel data obtained in the S2 by using a deep neural network, to obtain the frequency domain delay channel data with the off-axis scatter signals, which are suppressed;
    S4. performing an inverse short-time Fourier transform on the frequency domain delay channel data with the off-axis scatter signals, which are suppressed, obtained in the S3 to obtain the delay channel data of each channel that have been processed by the deep neural network;
    S5. dividing the delay channel data that have been processed by the deep neural network obtained in the S4 into corresponding sub-aperture vectors; and S6. performing a weighted summation and calculating an average with the apodization weight vector obtained in the S2 and sub-aperture vectors of the delay channel data that have been processed by the deep neural network obtained in the S5 to obtain image pixel values of the target object for ultrasound imaging, which is corresponded, thereby forming a complete ultrasound image.

2. The high-contrast minimum variance imaging method based on deep learning of claim 1, wherein in the step S1, the scanning the target object for ultrasound imaging, generating the channel data composed of the echo signals received by the reception channels of the ultrasound transducer, and then performing a delay operation on the channel data comprises: calculating a delay time according to a position of each of target points for imaging, a position of each of scan lines and a position of each reception channel, and mapping the delay time into a signal subscript, so as to extract a signal value corresponding to the target points for imaging in the echo signals of a reception channel and obtain the delay channel data; and let the number of the target points for imaging on one of the scan lines be P and the number of the reception channels be N, so that a P×N delay channel data matrix is obtained after the delay operation, and let the number of the scan lines be L, then a P×N×L delay channel data matrix M1 is needed for imaging each time, and subsequent steps will be performed based on this delay channel data matrix.

3. The high-contrast minimum variance imaging method based on deep learning of claim 1, wherein in the step S2, for one of target points for imaging, a delay channel data vector of a length N can be extracted from a delay channel data matrix M1; according to the principles of the minimum variance beamforming method, a spatial smoothing technique is used, that is, a full aperture that contains all the reception channels is divided into several overlapping sub-apertures, a covariance matrix of the delay channel data in each of sub-apertures is calculated individually, and then an average of the covariance matrices of all the sub-apertures is calculated; let the number of the channels of each of the sub-apertures be M, then there are N−M+1 sub-apertures in total, and let the sub-aperture vectors of the delay channel data be xi, where i=1, 2, . . . , N−M+1, and xi contains the delay channel data of i-th to (i+M−1)-th reception channels; then, according to the following formula, the covariance matrix of the delay channel data in each of the sub-apertures is calculated and an average is calculated to obtain a final estimated covariance matrix Rcov:

$$R_{cov} = \frac{1}{N-M+1} \sum_{i=1}^{N-M+1} x_i \cdot x_i^H;$$

where · represents a vector multiplication, and H represents a conjugate transposition; a minimum variance beamforming method aims at minimizing a variance of pixel values of the target points for imaging, and a optimization problem, i.e., to minimize the variance of the pixel values of the target points for imaging, is expressed as the following formula:

$$\min_w w^H \cdot R_{cov} \cdot w$$
$$\text{s.t. } w^H \cdot a = 1;$$

where a is an all-ones vector, · represents the vector multiplication, and w is the apodization weight vector of the channels; and the solution to the optimization problem is:

$$w = \frac{R_{cov}^{-1} \cdot a}{a^H \cdot R_{cov}^{-1} \cdot a};$$

where −1 represents a matrix inversion, and · represents the vector multiplication; and a weight vector has a length of M, and one of the weight vector is calculated for each of the target points for imaging.

4. The high-contrast minimum variance imaging method based on deep learning of claim 1, wherein in the step S2, the performing a short-time Fourier transform on the delay channel data obtained in the S1 means using a discrete short-time Fourier transform to transform the delay channel data from a time domain to a frequency domain; the discrete short-time Fourier transform means using a sliding of a window function to divide a long signal into several overlapping short signals, which are then subjected to a discrete Fourier transform separately to obtain the frequency domain delay channel data; and the formula of the discrete short-time Fourier transform is as follows:

$$STFT[y_p^n](m, k) = \sum_{p=1}^{P} y_p^n w(p-m) e^{\frac{-j2\pi kp}{P}};$$

where $y_p^n$ denotes the delay channel data of an n-th reception channel at a p-th target point for imaging on a scan line; p=1, 2, . . . , P; n=1, 2, . . . , N; w (p−m) is the window function, m being a step size of the sliding of the window function; k is a serial number of a Fourier frequency to be obtained, k having the same value range as p; and j is an imaginary unit.

5. The high-contrast minimum variance imaging method based on deep learning of claim 4, wherein the window function has a window length of 16, and the delay channel data of each reception channel on one scan line are a signal vector of a length P, so P−16+1 signal vectors of length 16 are obtained by the sliding of the window function; and according to a symmetry property of the discrete Fourier transform, when a signal sequence is a real-valued sequence, complex amplitudes obtained from a Fourier transform have a conjugate symmetry property, that is, provided that the signal sequence has a length of 16, then 2nd to 8th of the complex amplitudes and 10th to 16th of the complex amplitudes are conjugate symmetric, so only first nine of the complex amplitudes need to be used; for the one scan line, after the short-time Fourier transform of the channel data, a complex amplitude matrix M2 with a size of 9×(P−16+1)×N is obtained; and then, real and imaginary parts are separated and recombined in accordance with the reception channels, which are respective, and a data matrix M3 with a size of (2×N)×9×(P−16+1) is obtained, which is to be processed by the deep neural network.

6. The high-contrast minimum variance imaging method based on deep learning of claim 1, wherein in the step S3, the deep neural network used is a feed-forward fully-connected network with five hidden layers in total, each of the hidden layers having 170 neurons; each frequency corresponds to one of networks, so there are nine of the networks in total, and input and output dimensions of the networks are both 2×N; a data matrix M3 obtained for each scan line is input into the nine networks for processing according to respective frequencies, and the frequency domain delay channel data, which is obtained, with the off-axis scatter signals, which are suppressed, are a data matrix M4 with a size of (2×N)×9×(P−16+1); and a training process of the deep neural network is as follows: Field II simulation software is used to simulate and generate the off-axis scatter signals and non-off-axis scatter signals to form a data of a training set and of a validation set for the deep neural network; the deep neural network is trained with an Adam optimizer which uses a mean and a variance of gradients to calculate an update step size of network weight parameters, the data of the training set are input into the deep neural network in batch while the Adam optimizer updates parameters of the deep neural network, a training cycle is a period during which all the data of the training set are processed once, and the data of the validation set are used to calculate an error on the validation set and change a learning rate accordingly after each training cycle ends; and the training process adopts an early stopping strategy, that is, a training is subjected to early stopping in response to the error on the validation set having no improvement after 20 training cycles.

7. The high-contrast minimum variance imaging method based on deep learning of claim 1, wherein in the step S4, the frequency domain delay channel data with the off-axis scatter signals, which are suppressed, obtained in the step S3 is transformed into a time domain; a data matrix M4 is recombined into a complex magnitude matrix M5 with a size of 9×(P−16+1)×N, which is then expanded to a complex magnitude matrix M6 with a size of 16×(P−16+1)×N using a conjugate symmetry property; the complex amplitudes of each reception channel with a size of 16×(P−16+1) are transformed into time domain signals using the inverse short-time Fourier transform, thereby obtaining the delay channel data of each channel that have been processed by the deep neural network, with a length of P, and therefore, the delay channel data of L scan lines that have been processed by the deep neural network are a matrix M7 with a size of P×N×L, which is the same as a size of a delay channel data matrix M1 that has not been processed by the deep neural network.

8. The high-contrast minimum variance imaging method based on deep learning of claim 1, wherein in the step S5, according to the delay channel data that have been processed by the deep neural network obtained in the S4, for each target point for imaging on each scan line, a full aperture vector of length N of the delay channel data that have been processed by the deep neural network is extracted and divided into N−M+1 of the corresponding sub-aperture vectors $z_i$, where i=1, 2, . . . , N−M+1, and $z_i$ contains the delay channel data that have been processed by the deep neural network of i-th to (i+M−1)-th of the channels.

9. The high-contrast minimum variance imaging method based on deep learning of claim 1, wherein in step S6, the performing the weighted summation and calculating the average with the apodization weight vector obtained in the S2 and the sub-aperture vectors of the delay channel data that have been processed by the deep neural network obtained in the S5 is based on the following formula:

$$v = \frac{1}{N-M+1} \sum_{i=1}^{N-M+1} w^H \cdot z_i;$$

where the obtained v is a pixel value of target points for imaging, and · represents a vector multiplication; and pixel values of all the target points for imaging then constitute the complete ultrasound image, which has the advantage of having a high contrast.

* * * * *